(12) United States Patent
Misra

(10) Patent No.: US 7,634,617 B2
(45) Date of Patent: Dec. 15, 2009

(54) METHODS, SYSTEMS, AND COMPUTER PROGRAM PRODUCTS FOR OPTIMIZED COPYING OF LOGICAL UNITS (LUNS) IN A REDUNDANT ARRAY OF INEXPENSIVE DISKS (RAID) ENVIRONMENT USING BUFFERS THAT ARE LARGER THAN LUN DELTA MAP CHUNKS

(75) Inventor: Pawan Misra, Morrisville, NC (US)

(73) Assignee: EMC Corporation, Hopkinton, MA (US)

( * ) Notice: Subject to any disclaimer, the term of this patent is extended or adjusted under 35 U.S.C. 154(b) by 137 days.

(21) Appl. No.: 11/324,418

(22) Filed: Jan. 3, 2006

(65) Prior Publication Data

US 2007/0156956 A1 Jul. 5, 2007

(51) Int. Cl.
*G06F 13/00* (2006.01)
*G06F 13/28* (2006.01)
*G06F 3/00* (2006.01)
*G06F 5/00* (2006.01)
*G06F 12/00* (2006.01)
*G06F 17/30* (2006.01)

(52) U.S. Cl. ............................ 711/114; 710/52; 710/56; 707/204

(58) Field of Classification Search ................. 711/114; 710/56; 707/204
See application file for complete search history.

(56) References Cited

U.S. PATENT DOCUMENTS

| 5,050,161 | A | 9/1991 | Golestani |
| 5,901,327 | A | 5/1999 | Ofek |
| 6,044,444 | A | 3/2000 | Ofek |
| 6,108,748 | A | 8/2000 | Ofek et al. |
| 6,385,673 | B1 | 5/2002 | DeMoney |
| 6,415,300 | B1 * | 7/2002 | Liu ............................ 707/204 |
| 6,574,718 | B2 | 6/2003 | Sutherland et al. |
| 6,711,137 | B1 | 3/2004 | Klassen et al. |
| 6,779,093 | B1 | 8/2004 | Gupta |
| 6,907,481 | B2 | 6/2005 | Kovacevi |
| 6,973,555 | B2 | 12/2005 | Fujiwara et al. |
| 7,133,907 | B2 | 11/2006 | Carlson et al. |
| 7,278,047 | B2 | 10/2007 | Douglas et al. |
| 2002/0059276 | A1 | 5/2002 | Wei Loon et al. |

(Continued)

OTHER PUBLICATIONS

Official Action for U.S. Appl. No. 11/324,721, filed Feb. 13, 2008.

(Continued)

*Primary Examiner*—Matt Kim
*Assistant Examiner*—Edward J Dudek
(74) *Attorney, Agent, or Firm*—Jenkins, Wilson, Taylor & Hunt, P.A.

(57) ABSTRACT

Disclosed are methods, systems, and computer program products for optimized copying of logical units (LUNs) in a redundant array of inexpensive disks (RAID) environment using buffers that are larger than delta map chunks. According to one method, a delta map is provided including delta indicators for tracking locations of changes to data stored in a plurality of source delta map chunks representing partitions of storage in physical disks of a redundant array of inexpensive disks (RAID) array. A first buffer of a buffer size larger than a delta map chunk size is provided. An amount of data is sequentially copied to fill the first buffer beginning at an address in the delta map chunk corresponding to a first change indicated by a delta indicator in the delta map.

27 Claims, 8 Drawing Sheets

U.S. PATENT DOCUMENTS

| | | | |
|---|---|---|---|
| 2003/0185154 | A1 | 10/2003 | Mullendore et al. |
| 2004/0250032 | A1 | 12/2004 | Ji et al. |
| 2005/0050287 | A1 | 3/2005 | Boyd et al. |
| 2005/0055520 | A1 | 3/2005 | Kappler |
| 2005/0262266 | A1 | 11/2005 | Wiberg et al. |
| 2006/0248125 | A1* | 11/2006 | Kawamura .................. 707/201 |
| 2007/0083722 | A1* | 4/2007 | Per et al. .................... 711/162 |
| 2007/0156958 | A1 | 7/2007 | Misra |

OTHER PUBLICATIONS

Official Action for U.S. Appl. No. 10/877,647, filed Jan. 28, 2008.
Official Action for U.S. Appl. No. 10/877,647, filed Nov. 20, 2007.
Official Action for U.S. Appl. No. 10/877,647, filed Dec. 7, 2006.
Interview Summary for U.S. Appl. No. 11/324,721, filed Jun. 25, 2008.
Interview Summary for U.S. Appl. No. 10/877,152, filed Oct. 24, 2008.
Final Official Action for U.S. Appl. No. 11/324,721, filed Oct. 6, 2008.
Advisory Action Before the Filing of an Appeal Brief for U.S. Appl. No. 10/877,152, filed Sep. 17, 2008.
Notice of Abandonment for U.S. Appl. No. 10/877,647, filed Aug. 19, 2008.
Final Official Action for U.S. Appl. No. 10/877,152, filed Jun. 9, 2008.
Official Action for U.S. Appl. No. 10/877,152, filed Nov. 1, 2007.
Advisory Action Before the Filing of an Appeal Brief for U.S. Appl. No. 10/877,152, filed Jun. 19, 2007.
Final Official Action for U.S. Appl. No. 10/877,152, filed Apr. 6, 2007.
Official Action for U.S. Appl. No. 10/877,152, filed Oct. 30, 2006.
Official Action for U.S. Appl. No. 11/324,721, filed Apr. 14, 2009.
Commonly-assigned, co-pending U.S. patent application for "Methods, Systems, and Computer Program Products for Optimized Copying of Logical Units (LUNs) in a Redundant Array of Inexpensive Disks (RAID) Environment Using Buffers That Are Smaller Than Lun Delta Map Chunks" (Filed Jan. 3, 2006, Serial No. Not Yet Assigned).
Commonly-assigned, co-pending U.S. Appl. No. 10/877,647 for "System and Method for Allocating Memory Resources Used for Movement of Data Being Copied in a Data Storage Environment" (filed Jun. 25, 2004).
Commonly-assigned, co-pending U.S. Appl. No. 10/877,152 for "System and Method for Managing Use of Available Bandwidth for a Link Used for Movement of Data Being Copied in a Data Storage Environment" (filed Jun. 25, 2004).

* cited by examiner

METHODS, SYSTEMS, AND COMPUTER PROGRAM PRODUCTS FOR OPTIMIZED COPYING OF LOGICAL UNITS (LUNS) IN A REDUNDANT ARRAY OF INEXPENSIVE DISKS (RAID) ENVIRONMENT USING BUFFERS THAT ARE LARGER THAN LUN DELTA MAP CHUNKS

TECHNICAL FIELD

The subject matter described herein relates to copying of delta map chunks. More particularly, the subject matter described herein relates to methods, systems, and computer program products for optimized copying of logical units (LUNs) in a redundant array of inexpensive disks (RAID) environment using buffers that are larger than LUN delta map chunks.

BACKGROUND

RAID arrays are logical representations of disk arrays created by binding individual physical disks together to form the RAID arrays. RAID arrays represent a logically contiguous address space distributed across a set of physical disks. Each physical disk is subdivided into pieces used to spread the address space of the RAID array across the array (along with parity information if applicable to the RAID level). The physically contiguous pieces of the physical disks that are joined together to create the logically contiguous address space of the RAID array are called stripes.

Applications (clients) access and store data incrementally in RAID arrays using logical storage array partitions, known as logical units (LUNs). LUNs are exported from a RAID array for use at the application level. LUNs map to physically provisioned storage space in the physical disks that make up a RAID array. The granularity of a LUN is determined by the size of delta map chunks provisioned for the RAID array. A "delta map chunk," as used herein, is a partition of a LUN. Thus, the physical disks of a RAID array may be partitioned into LUNs, which may in turn be partitioned into delta map chunks. In some implementations, provisioned delta map chunks range from as little as two kilobytes to sixty four kilobytes, with two kilobytes being a typical default delta map chunk size.

Copies of LUNs may be made either for point-in-time system references to track system changes over time or for archival purposes. When copies are to be archived or communicated to another physical platform, they must be transferred to communication buffers and transmitted across a network to the other platform. In conventional RAID systems, communication buffer size has been set equal to delta map chunk size. As a result, when copying data from one RAID array to another RAID array, the number of copy operations that must be performed is equal to the number of delta map chunks to be copied. In order to increase the efficiency of copying large numbers of delta map chunks, it may be desirable to increase the communication buffer size. However, conventional RAID array copying systems require that the communication buffer size be equal to the delta map chunk size, resulting in an excessive number of copy operations.

Another problem with archiving RAID arrays is a collision. A collision is an access by more than one module to the same delta map chunk location resulting in a potential corruption of data at that storage location. Collisions may occur when a source LUN is being archived or transferred to a remote system and changes to the source LUN data are being made on the local system. Collisions may also occur at both the source and destination when a client performs mirror copies to both the source and destination RAID arrays while a source LUN is being archived to the destination RAID array. For example, a collision may occur when a client data storage operation and a sync engine storage operation are performed to the same delta map chunk location. A client data store operation is a write operation by an application to a LUN. A sync engine storage operation is a write operation by a sync engine to synchronize data from one LUN to another LUN. Collision management has traditionally been handled by incrementally copying the LUN and prohibiting write operations to the area being copied.

Accordingly, in light of these difficulties associated with conventional RAID array LUN buffer backup utilities, there exists a need for improved methods, systems, and computer program products for optimized copying of LUNs in a RAID array using buffers that are larger than LUN delta map chunks.

SUMMARY

According to one aspect, the subject matter described herein comprises methods, systems, and computer program products for optimized copying of logical units (LUNs) in a redundant array of inexpensive disks (RAID) environment using buffers that are larger than delta map chunks. One method includes providing a delta map including delta indicators for tracking locations of changes to data stored in a plurality of source delta map chunks representing partitions of storage in physical disks of a redundant array of inexpensive disks (RAID) array, providing a first buffer of a buffer size larger than a delta map chunk size, and sequentially copying an amount of data to fill the first buffer beginning at an address in the delta map chunk corresponding to a first change indicated by a delta indicator in the delta map.

The subject matter described herein for optimized copying of logical units (LUNs) in a redundant array of inexpensive disks (RAID) environment using buffers that are larger than delta map chunks may be implemented using a computer program product comprising computer executable instructions embodied in a computer readable medium. Exemplary computer readable media suitable for implementing the subject matter described herein include disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

In view of the problems described above with respect to traditional buffer dimensioning, the subject matter described herein describes a generic universal copy engine for flexible and dynamic buffer usage. Where previously buffer size had to be fixed to the delta map chunk size, the methods, systems, and computer program products described herein optimize copying of LUNs in RAID array using buffers that are larger than LUN delta map chunks. With the advent of faster networks, such as, for example, 2 Gbit fiber networks, larger buffers may now be used. Further, by making the algorithms for copying LUNs more generic, larger buffers may be used without aligning buffers to delta map chunk boundaries. By adapting the buffer definition to a more generic definition and by adapting buffer usage to allow it to be larger than the delta map chunk, the copying of LUNs may be improved.

Figure 1:
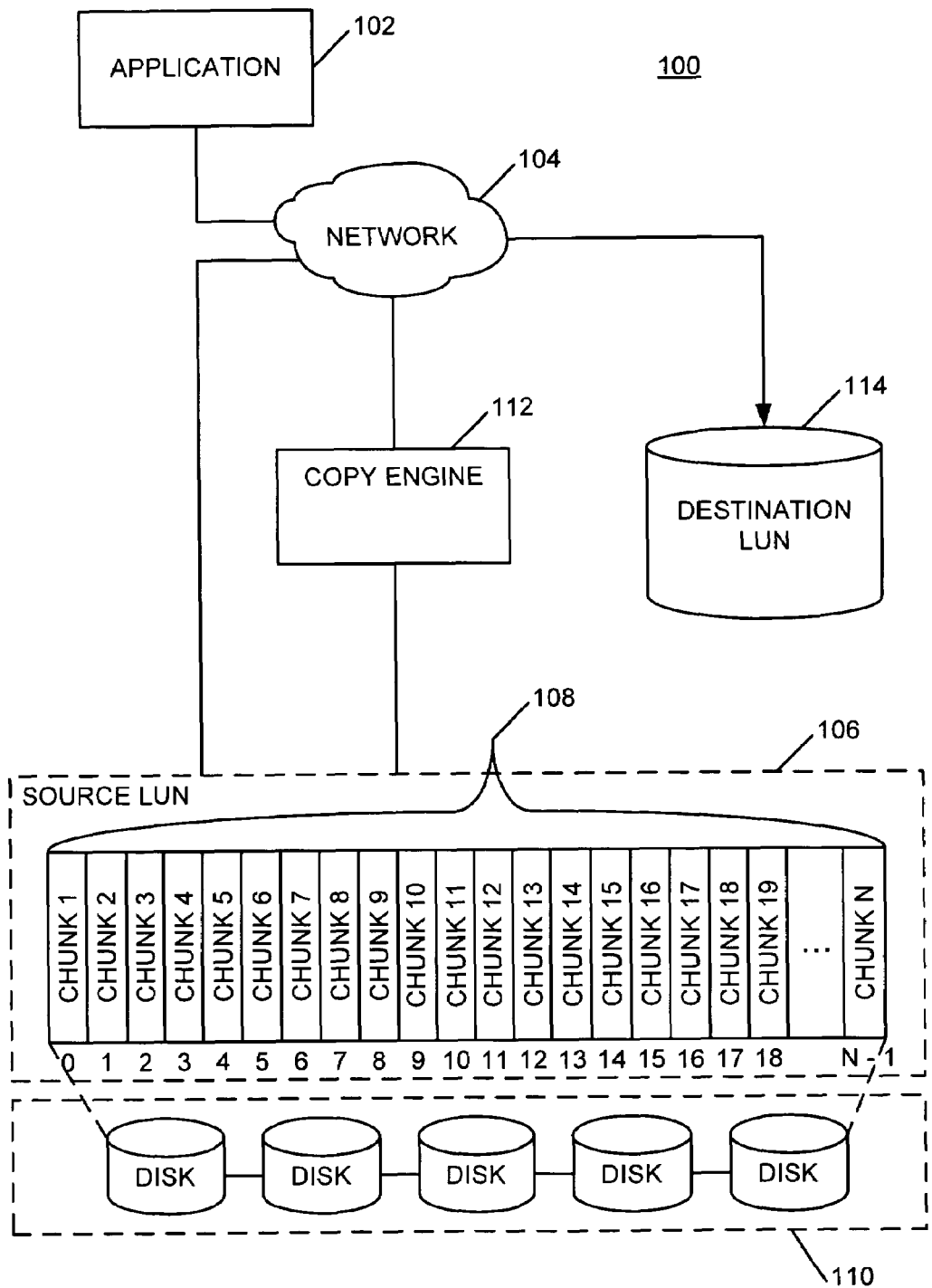
FIG. 1 is a block diagram of an exemplary redundant data storage system for storing a redundant copy of data by copying data from one logical unit (LUN) to another LUN using buffers that are larger than delta map chunk sizes according to an embodiment of the subject matter described herein.

FIG. 1 illustrates an exemplary redundant data storage system 100 for storing a redundant copy of data by copying data from one LUN to another LUN using buffers that are larger than delta map chunk sizes. Application 102 represents a client that may store data to a RAID array. Application 102 is shown connected to network 104 for communication with other components of redundant data storage system 100. Network 104 is connected to source logical unit (LUN) 106. Source LUN 106 is a data structure that represents physical storage in RAID array 110. Source LUN 106 includes a plurality of delta map chunks 108 each representing a physical data storage segment of RAID array 110. Source LUN 106 represents a logically contiguous view of a portion of a physical RAID array 110, and as such, provides a mapping of delta map chunks 108 onto RAID array 110. Source LUN 106 may map a portion of RAID array 110 or may map the entire RAID array 110.

For simplification, source LUN 106 is illustrated as a logical layer that resides adjacent to RAID array 110, which may include physical disks. However, it is understood that one or more logical layers, such as aggregations of source LUNs 106 and RAID arrays, may reside between source LUN 106 and the physical disks that make up RAID array 110 without departing from the scope of the subject matter described herein.

Copy engine 112 may be a hardware, software, and/or firmware-implemented component that copies data from one LUN to another LUN or that copies data between locations within a RAID array. In the illustrated example, copy engine 112 interfaces with network 104 and source LUN 106 to perform copy operations from RAID array 110, represented within source LUN 106, to destination LUN 114. Destination LUN 114 may be physically separate from RAID array 110 or may be located within RAID array 110. Copy engine 112 may use copy buffers which are larger than the size of delta map chunks 108, as will be described in more detail below.

The system illustrated in FIG. 1 is adapted to copy data between source and destination LUNs and prevent data corruption when collisions occur. As described above, a collision can occur when an application is writing data to a delta map chunk that is being copied by a sync engine, such as copy engine 112. For example, during mirroring an application writes data to source and destination LUNs. If copy engine 112 is performing a copy operation involving the same delta map chunks associated with either the source or destination LUN, a collision may occur. As will be described in more detail below, collisions may be tracked to allow the affected delta map chunks to be copied on the next pass of the copy or sync process.

For non-mirrored data writes by an application, collisions may only occur at the source LUN because the application is only interacting with the source LUN. As with the mirrored case, collisions at the source may be tracked for non-mirrored data writes to allow the affected delta map chunks to be copied on the next pass of the copy or sync process. An exemplary hardware platform on which redundant data storage system 100 may be implemented is the CLARiiON® platform available from EMC Corporation of Hopkinton, Mass. For performance reasons and to overcome some of the limitations described above related to traditional systems where buffer sizes were matched with delta map chunk sizes, buffers of as large as one megabyte or more may be used to allow fewer message processing and acknowledgement iterations for a given RAID array backup operation. Thereby, bandwidth may be saved and larger portions of a RAID array may be backed up in single transmission phases. Collisions may be handled, as will be described below, to accommodate the larger number of delta map chunks that may be transmitted within a single buffer based upon the subject matter described herein.

Figure 2A:
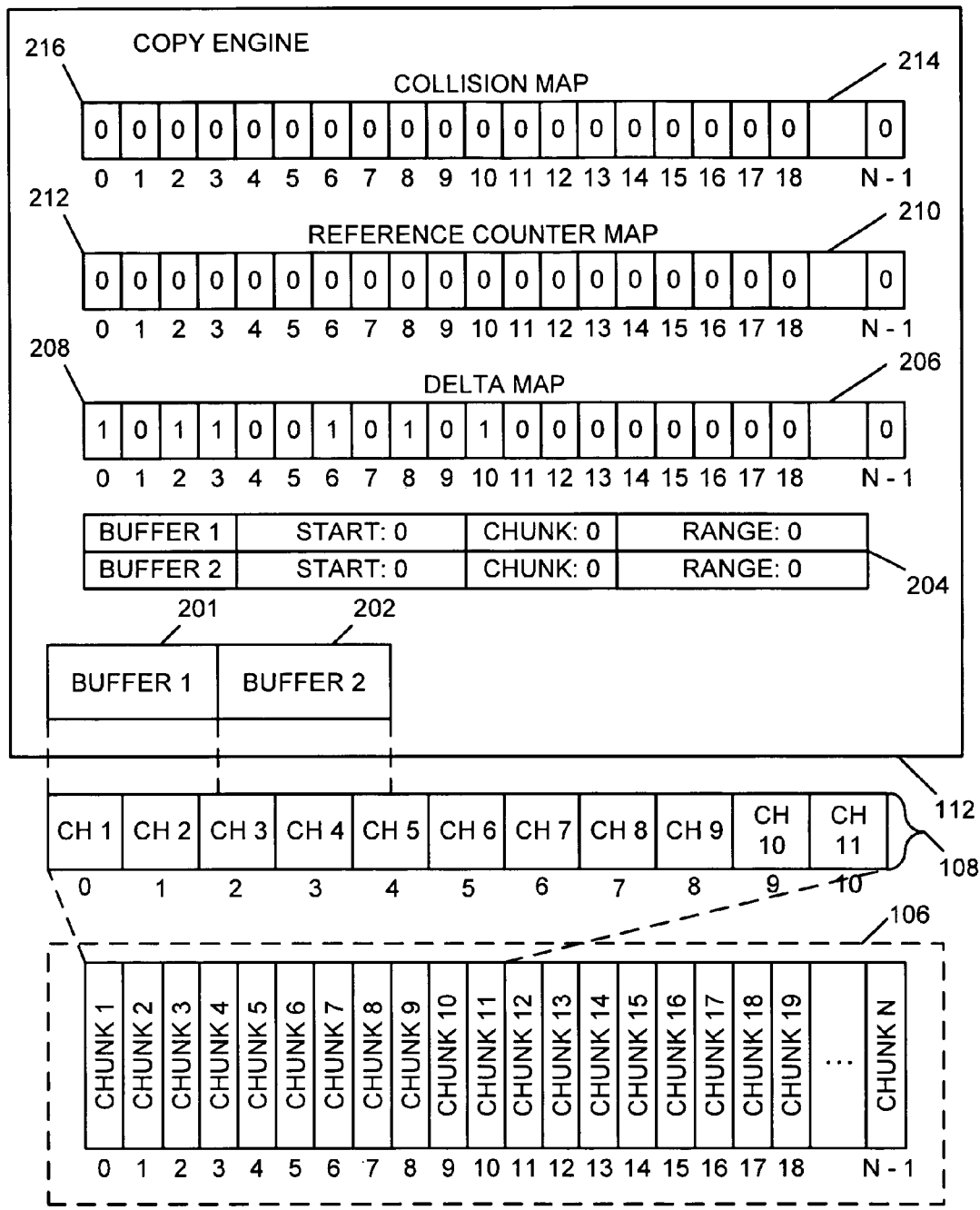
FIG. 2A is a block diagram of an exemplary redundant data storage system for storing a redundant copy of data by copying data from a source RAID array to a destination RAID array using buffers that are larger than delta map chunk sizes in an initial state prior to any copy operations according to an embodiment of the subject matter described herein.

FIGS. 2A-2D further illustrate exemplary redundant data storage system 100 for storing a redundant copy of data by copying data from one RAID array to another RAID array using buffers that are larger than delta map chunk sizes. FIG. 2A illustrates exemplary redundant data storage system 100 at an initial state prior to any copy operations. For simplicity, two buffers, buffer 1 201 and buffer 2 202, are shown. Other buffer arrangements are possible and all are considered within the scope of the subject matter described herein. In FIGS. 2A-2D, a magnified view of boundaries of delta map chunks 108 is shown to illustrate alignment with buffers 201 and 202. In addition, RAID array 110 is omitted from FIGS. 2A-2D for simplicity.

Buffer 1 201 and buffer 2 202 are shown associated with copy engine 112 and may be physically located either internal to or external to copy engine 112. For example, copy engine 112 may allocate memory for buffers 201 and 202 to copy data from source LUN 106 to destination LUN 114. In the illustrated example and for ease of explanation, delta map chunks 108 will be assumed to have a size of 64 kilobytes and buffers 201 and 202 will be assumed to have a size of 144 kilobytes. Pointer structures and other referencing mechanisms for associating buffers with delta map chunks are possible and all may be used without departing from the scope of the subject matter described herein.

A buffer descriptor is a data structure that may be created and used by copy engine 112 to track usage of buffers 201 and 202. In the illustrated example, buffer descriptors 204 store a starting address, a starting delta map chunk number, and a range accessible for copying by each buffer. The range includes a number of delta map chunks to be copied via the buffers to destination LUN 114. From the range and buffer size, the starting address for the next buffer may be calculated. The buffer descriptors for buffers 201 and 202 are set to default values initially.

A delta map is a data structure, such as, for example, a bit map, that may be created and used by copy engine 112 to track changes to delta map chunks 108. In the illustrated example, delta map 206 includes an indicator 208 associated with each delta map chunk 108 of source LUN 106. Indicators in delta map 206 may be used to indicate when data has been changed in any delta map chunk 108 of source LUN 106.

A reference counter map is a data structure that may be created and used by copy engine 112 to keep track of access to delta map chunks 108. In the illustrated example, reference counter map 210 includes counters 212 associated with each delta map chunk 108 of source LUN 106. When a buffer is associated with a delta map chunk in order to perform a copy operation, the respective counter in reference counter map 210 may be incremented to indicate that the respective delta map chunk is currently being accessed for a read operation. When more than one buffer is associated with a delta map chunk, each association may increment the respective counter in reference counter map 210. In this way, reference counter map 210 may be used to track buffer overlays onto source LUN 106. As well, delta map chunks at buffer boundaries where more than one buffer accesses a delta map chunk may be tracked. When a buffer read operation is followed by a write operation to a destination LUN, such as destination LUN 114, the respective reference counters in reference counter map 210 associated with delta map chunks copied may be decremented to indicate that the buffer copy operation has been completed.

A collision map is a data structure that may be created and used by copy engine 112 to avoid collisions. In the illustrated example, collision map 214 includes indicators 216 associated with each delta map chunk 108 of source LUN 106. As will be described in more detail below, indicators in collision map 214 may be used to manage race conditions between application 102 and copy engine 112 with respect to either source LUN 106 or destination LUN 114.

When application 102 writes data to an area of RAID array 110 represented by source LUN 106, an indicator associated with each delta map chunk written may be set in delta map 206. Delta map 206 shows several indicators set. Indicators at delta map 206 indexes zero, two, three, six, eight, and ten have been set indicating that application 102 has changed data in the respective delta map chunks of source LUN 106.

When copy engine 112 initiates a copy operation, delta map 206 may be searched for the first indicator of changed data in source LUN 106. In FIG. 2A, the first change indicator is at index zero. Accordingly, copy engine 112 aligns buffer 1 201 with a start address at the beginning of the delta map chunk at index zero in source LUN 106. The first change indicator can be at any index in delta map 206, ranging from the first to the last index. As such, the start address for buffer 1 201 can be aligned with any index in delta map 206, ranging from the first to the last index.

As may be seen from FIG. 2A, buffer 1 201 is shown adjacent to delta map chunks 108 of source LUN 106 at indexes zero, one, and two. Buffer 1 201 has a capacity larger than a delta map chunk and includes sufficient space to copy delta map chunks at indexes zero and one along with a portion of the delta map chunk at index two. Buffer 2 202 is shown adjacent to the remaining portion of delta map chunk at index two, the delta map chunk at index three, and a portion of the delta map chunk at index four.

Figure 2B:
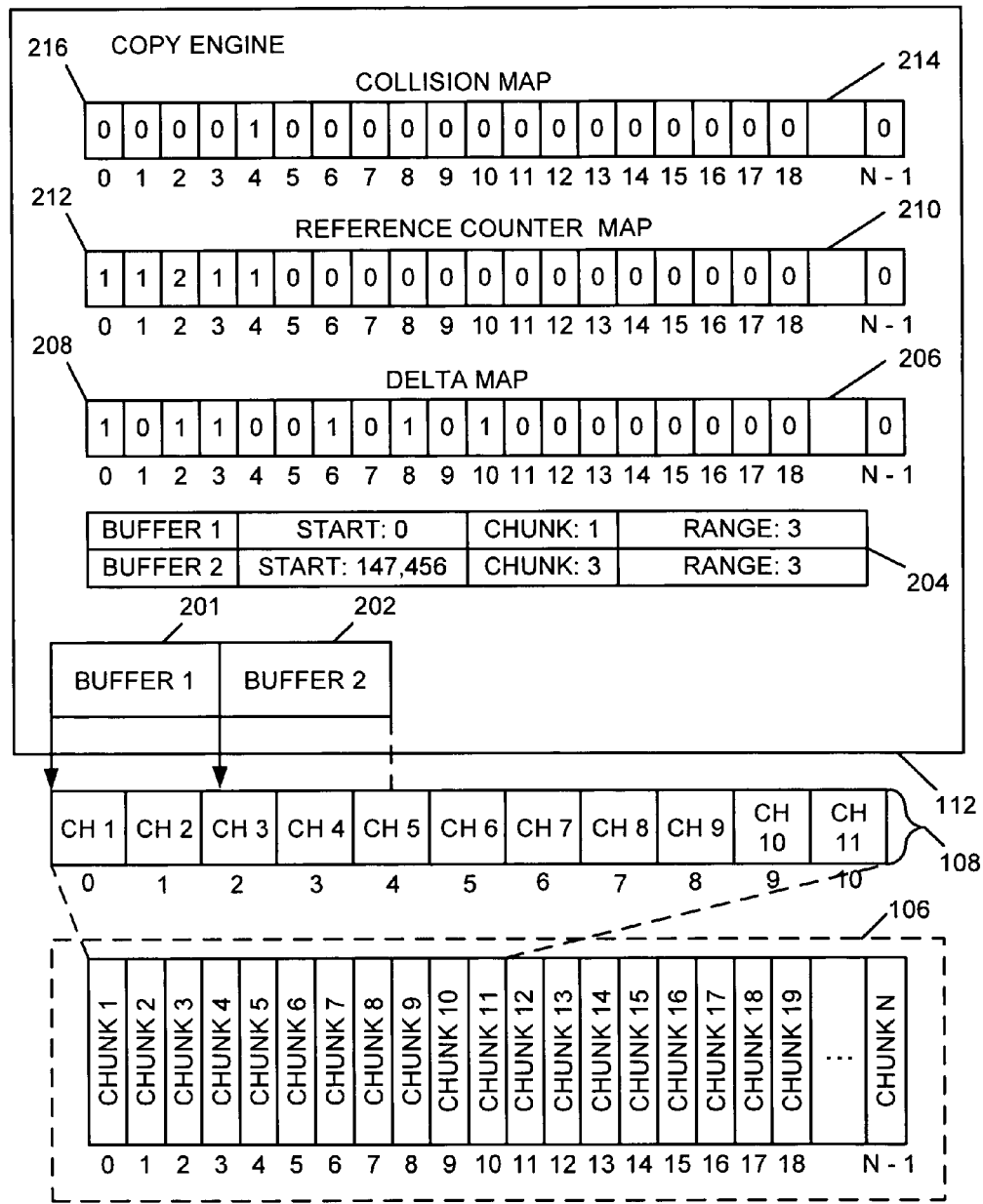
FIG. 2B is a block diagram of an exemplary redundant data storage system for storing a redundant copy of data by copying data from a source RAID array to a destination RAID array using buffers that are larger than delta map chunk sizes during an initial buffer copy phase according to an embodiment of the subject matter described herein.

FIG. 2B illustrates redundant data storage system 100 during an initial buffer copy phase. As can be seen from FIG. 2B, reference counter map 210 has been updated to indicate that delta map chunks at indexes zero and one have one buffer, buffer 1 201, associated with them. The counter in reference counter map 210 associated with index two has been incremented twice to show that two buffers, buffer 1 201 and buffer 2 202, are associated with the delta map chunk at index two. The counters in reference counter map 210 for delta map chunks at index three and four have each been incremented to show that one buffer, buffer 2 202, is associated with these delta map chunks. As can be seen from FIG. 2B, the end of buffer 2 202 falls in the middle of the delta map chunk at index four. Accordingly, only a portion of the delta map chunk at index four may be copied into buffer 2 202. As described above, more or larger buffers may be provided without departing from the scope of the subject matter described herein.

Buffer descriptors 204 for buffers 201 and 202 are set as follows and assume byte addressability for ease of description. For buffer 1 201, the start address is zero, the starting delta map chunk number is one (1) (e.g., for chunk 1 at index 0), and the range of the copy is set to three (3). The range indicates the number of delta map chunks 108 that are accessed by the copy operation. From the range and buffer size, the starting address for the next buffer may be calculated. Accordingly, for buffer 2 202, the start address is 147,456 (the address adjacent to the end address for buffer 1 201), the starting delta map chunk number is three (3) (e.g., for chunk 3 at index 2), and the range of the copy is set to three (3) to indicate the number of delta map chunks 108 that are accessed by the copy operation.

In the illustrated example, as can be seen, for example, in FIG. 2B, an entry in collision map 214 is present at index four. Index four has been chosen for illustrative purposes. A collision may occur in a variety of ways. For example, when a client does not mirror data to a separate storage area, such as destination LUN 114, a collision may occur when an application 102 performs a write operation to a delta map chunk represented in reference counter map 210 with a counter value greater than zero, which, as described above, indicates that the delta map chunk is currently being copied to the buffer for storage in the destination storage area. In this way, reference counter map 210 may be used to track collisions on the source LUN 106 and collision map 214 may be used to record collision events. Another example of a collision event may occur when a client mirrors data to a separate storage area, such as destination LUN 114. In this case, in addition to the collision described above for a non-mirroring client, a collision may occur when application 102 performs a write operation to the destination storage area after a buffer copy to the same delta map chunks in the destination storage area has been issued. Both collision types will be described in more detail below. In either a situation where a client mirrors or does not mirror data writes to a destination storage area, such as destination LUN 114, indicators in collision map 214 may be used to indicate that a collision has occurred.

As described above, buffer 2 202 has copied a portion of the data stored within the delta map chunk at index four. However, because of the collision occurring at the delta map chunk at index four, the portion of data in buffer 2 202 from the delta map chunk at index four may be considered old data. For clients that do not mirror data to destination LUN 114, a write operation from buffer 1 201 and buffer 2 202 may still be performed to destination LUN 114. For clients that mirror data, the write operation may be abandoned, as will be described in more detail below. When clients do not mirror data, only the data from delta map chunks at indexes zero through three may be considered valid data. When the write operation to destination LUN 114 completes, the indicators in delta map 206 associated with delta map chunks at indexes zero through three may be cleared (not shown in FIG. 2B) and the indicator at index four may be set (not shown in FIG. 2B). It should be noted, that the indicator in delta map 206 at index four would be set without a collision at this delta map chunk due to the partial copy of the delta map chunk at index four. The collision at the delta map chunk at index four has been introduced at this index to allow a description of collision management below. As will be described in more detail below, collision indicators map to delta indicators differently according to whether the client mirrors or does not mirror data.

Figure 2C:
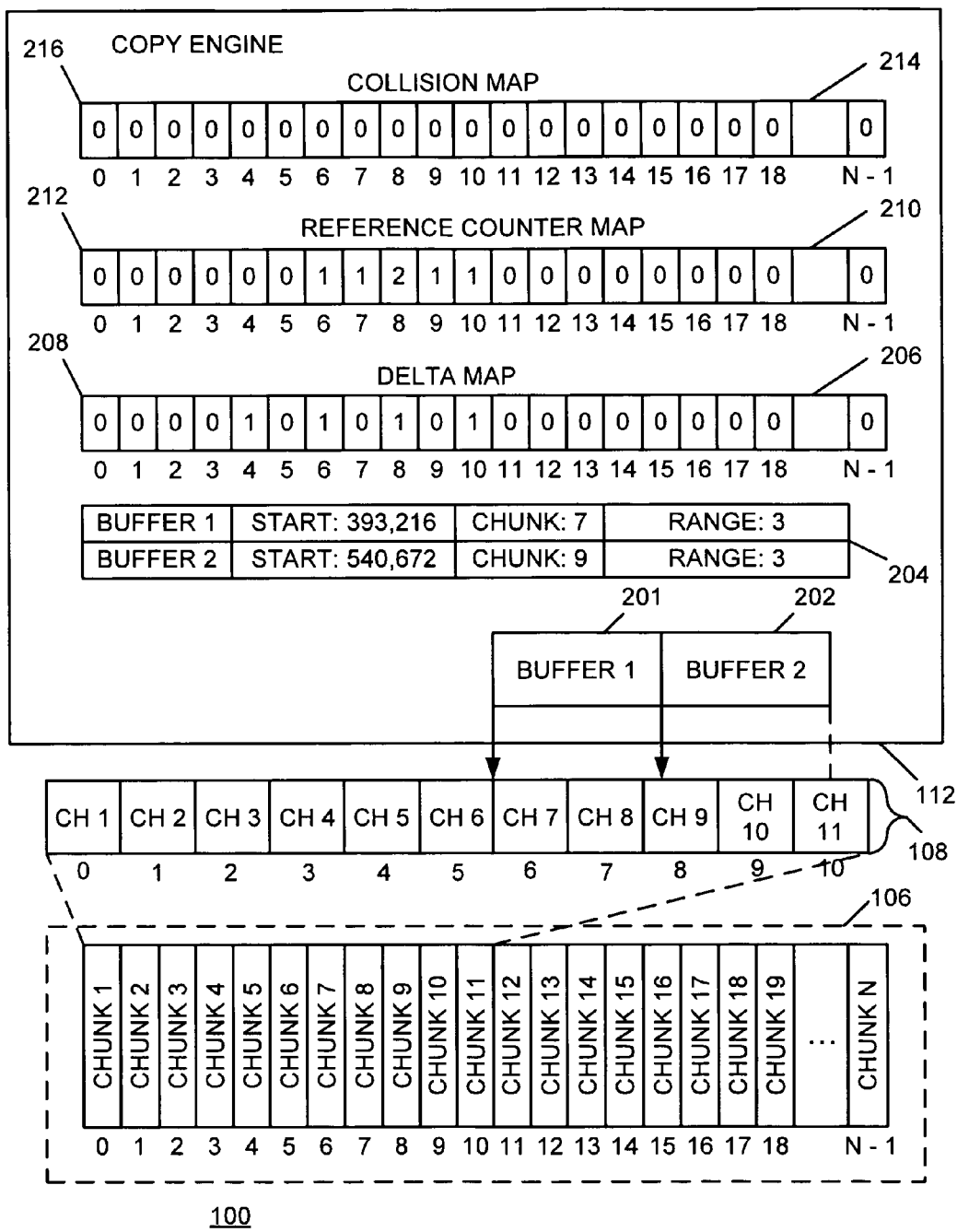
FIG. 2C is a block diagram of an exemplary redundant data storage system for storing a redundant copy of data by copying data from a source RAID array to a destination RAID array using buffers that are larger than delta map chunk sizes where a client does not mirror data to the destination RAID array according to an embodiment of the subject matter described herein.

FIG. 2C illustrates redundant data storage system 100 for a situation in which application 102 does not mirror data to destination LUN 114. As may be seen from FIG. 2C, the delta indicator associated with the delta map chunk at index four is set in delta map 206 and the collision indicator at the same index in collision map 214 has been cleared. As described above, the setting of the delta map indicator may be performed in response to a collision indicator in collision map 214 or it may remain set based upon a partial copy of the delta map chunk at a given index. In this exemplary embodiment, both situations are true and the delta indicator at index four in delta map 206 is set. Further, the delta map indicators at indexes zero, two and three have been cleared to indicate that the copy of those delta map chunks to destination LUN 114 has completed. As can be seen from FIG. 2C, a one-to-one relationship of collision indicators to delta map indicators exists when clients do not mirror data. As will be described in more detail below, when clients mirror data, a one-to-many collision indicator to delta map indicator relationship exists.

Accordingly, instead of moving the start address of buffer 1 201 to an address in the middle of the delta map chunk at index four after the end of the copy done by buffer 2 202 described above, the start address for buffer 1 201 has been aligned with the beginning of the delta map chunk at index six and the data in the delta map chunk at index four may be copied on a subsequent pass through the delta map.

Buffer descriptors 204 for buffers 201 and 202 are set as follows and assume byte addressability for ease of description. For buffer 1 201, the start address is set to 393,216 (e.g., at 384 kilobytes relative to source LUN 106), the starting delta map chunk number is seven (7) (e.g., for chunk 7 at index 6), and the range of the copy is set to three (3) to indicate the number of delta map chunks 108 that are accessed by the copy operation. For buffer 2 202, the start address is 540,672 (the address adjacent to the end address for buffer 1 201), the starting delta map chunk number is nine (9) (e.g., for chunk 9 at index 8), and the range of the copy is set to three (3) to indicate the number of delta map chunks 108 that are accessed by the copy operation.

Reference counter map 210 shows the buffer overlay counters incremented, as described above, for each delta map chunk accessed for copying by the buffers. It should be noted that even a partial access will increment a counter in reference counter map 210, as can be seen at index ten in both source LUN 106 and reference counter map 210 where buffer 2 202 overlays part of the delta map chunk at index ten.

The copy process as described above may continue for the delta map chunks overlaid for buffer 1 201 and buffer 2 202. The delta indicators for indexes six and eight of delta map 206 may be cleared after data has been successfully written to destination LUN 114. The delta indicator at index ten may not be cleared because only a partial copy of the data from the delta map chunk at index ten has been completed. On a subsequent iteration of the buffer copy process by copy engine 112, the remainder of the delta map chunk at index ten and subsequent delta map chunks may be copied and the process may iterate until all delta map chunks have been copied to destination LUN 114.

As described above, when a collision occurs and an application does not mirror data to a destination storage area, such as destination LUN 114, data previously copied from a delta map chunk may be considered old data and the start address for this copy iteration of buffer 1 201 has been aligned with the beginning of the delta map chunk at index six. Similarly, when a collision occurs and an application mirrors data, buffer alignment may be performed as for the non-mirroring case. However, as described above and in more detail below, the mapping of a collision indicator in collision map 214 to delta indicators in delta map 206 may be different for the case where an application mirrors data.

Figure 2D:
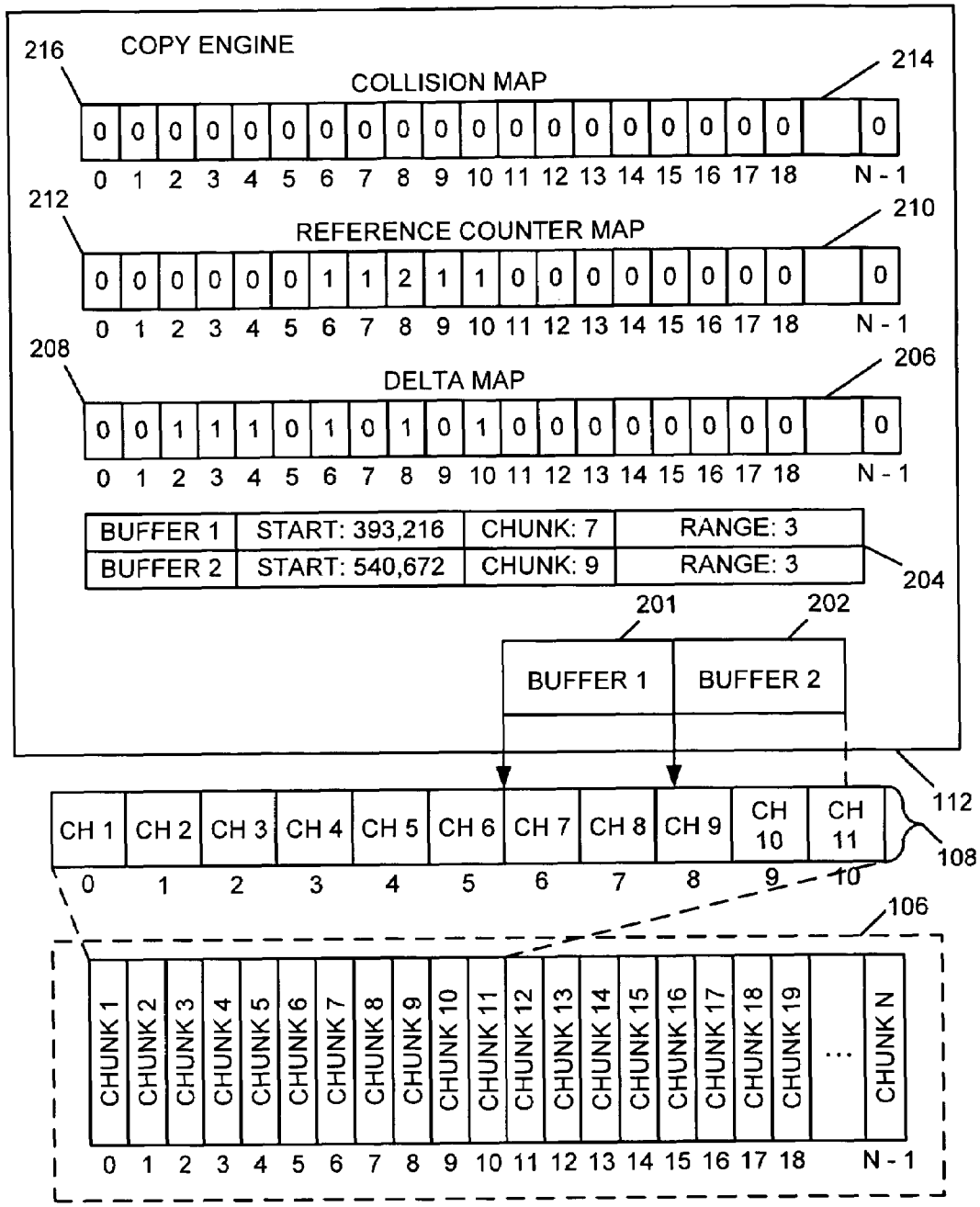
FIG. 2D is a block diagram of an exemplary redundant data storage system for storing a redundant copy of data by copying data from a source RAID array to a destination RAID array using buffers that are larger than delta map chunk sizes where a client mirrors data to the destination RAID array according to an embodiment of the subject matter described herein.

FIG. 2D illustrates redundant data storage system 100 for an embodiment wherein application 102 does perform mirror copies to destination LUN 114. In the description of FIG. 2B above, a collision was indicated to have occurred at the delta map chunk represented by index four in source LUN 106. Also as described above, when a client, such as application 102, mirrors data, an additional race condition may exist at the destination LUN 114. To manage this additional race condition, copy engine 112 may skip a copy cycle for the delta map chunk at index four and may align the start address for buffer 1 201 at the next index in delta map 206 with a delta indication showing that data has been changed in a delta map chunk represented by source LUN 106. In this exemplary embodiment, as may be seen from FIG. 2B described above, index six of delta map 206 previously indicated a change in the delta map chunk data at index six of source LUN 106.

As also described above, when a client mirrors data, a one-to-one mapping of collision map indicators to delta map indicators does not exist. Rather, a one-to-many relationship exists. As can be seen from FIG. 2D, the collision indicator at index four in collision map 214, which represented a collision at the delta map chunk in destination LUN 114 at index four, has been cleared. The delta indicators in delta map 206 at indexes two, three, and four remain set. This illustrates the one-to-many mapping for the collision case where the client application, such as application 102, mirrors data to destination LUN 114.

Because no collision occurred for the delta map chunk associated with buffer 1 201, the contents of buffer 1 201 may be written to destination LUN 114. However, unlike the non-mirrored case, the collision indicator at index four in collision map 214, may result in an abandonment of the write operation for buffer 2 202 to prevent overwriting new application data in destination LUN 114. Accordingly, the contents of buffer 2 202, which, as can be seen by reference to FIG. 2B, mapped to a portion of the delta map chunk at index two, the entire delta map chunk at index three, and a portion of the delta map chunk at index four, have not been written to destination LUN 114 and will need to be written to destination LUN 114 on the next pass of the copy process.

Buffer descriptors 204 for buffers 201 and 202 are set as follows and assume byte addressability for ease of description. For buffer 1 201, the start address is set to 393,216 (e.g., at 384 kilobytes relative to source LUN 106), the starting delta map chunk number is seven (7) (e.g., for chunk 7 at index 6), and the range of the copy is set to three (3) to indicate the number of delta map chunks 108 that are accessed by the copy operation. For buffer 2 202, the start address is 540,672 (the address adjacent to the end address for buffer 1 201), the starting delta map chunk number is 9 (e.g., for chunk 9 at index 8), and the range of the copy is set to three (3) to indicate the number of delta map chunks 108 that are accessed by the copy operation.

After completion of the write operation for buffers 201 and 202, delta map indicators at indexes six and eight may be cleared (not shown in FIG. 2D). However, the indicator at index ten may not be cleared because only a portion of that delta map chunk was copied by buffer 2 202.

Copy engine 112 may continue iteratively copying delta map chunks in this manner until the end of source LUN 106 is reached. As can also be seen from FIG. 2D, each iteration of copying by copy engine 112 may skip unchanged delta map chunks and align with the first delta map chunk represented by a delta indicator in delta map 206.

As described above, the delta map indicator at index two of delta map 206 is the lowest index for a delta map chunk that will not copied in this pass of the copy process. Accordingly, copy engine 112 may begin copying at the delta map chunk represented by index two, absent an intervening change to the data of the delta map chunks at indexes zero and one, on the next copy pass through LUN 106.

FIGS. 2A-2D illustrate several scenarios related to use of copy engine 112 for copying source LUN 106 to destination LUN 114. Many other embodiments are possible. Accordingly, all are considered within the scope of the subject matter described herein.

Figure 3:
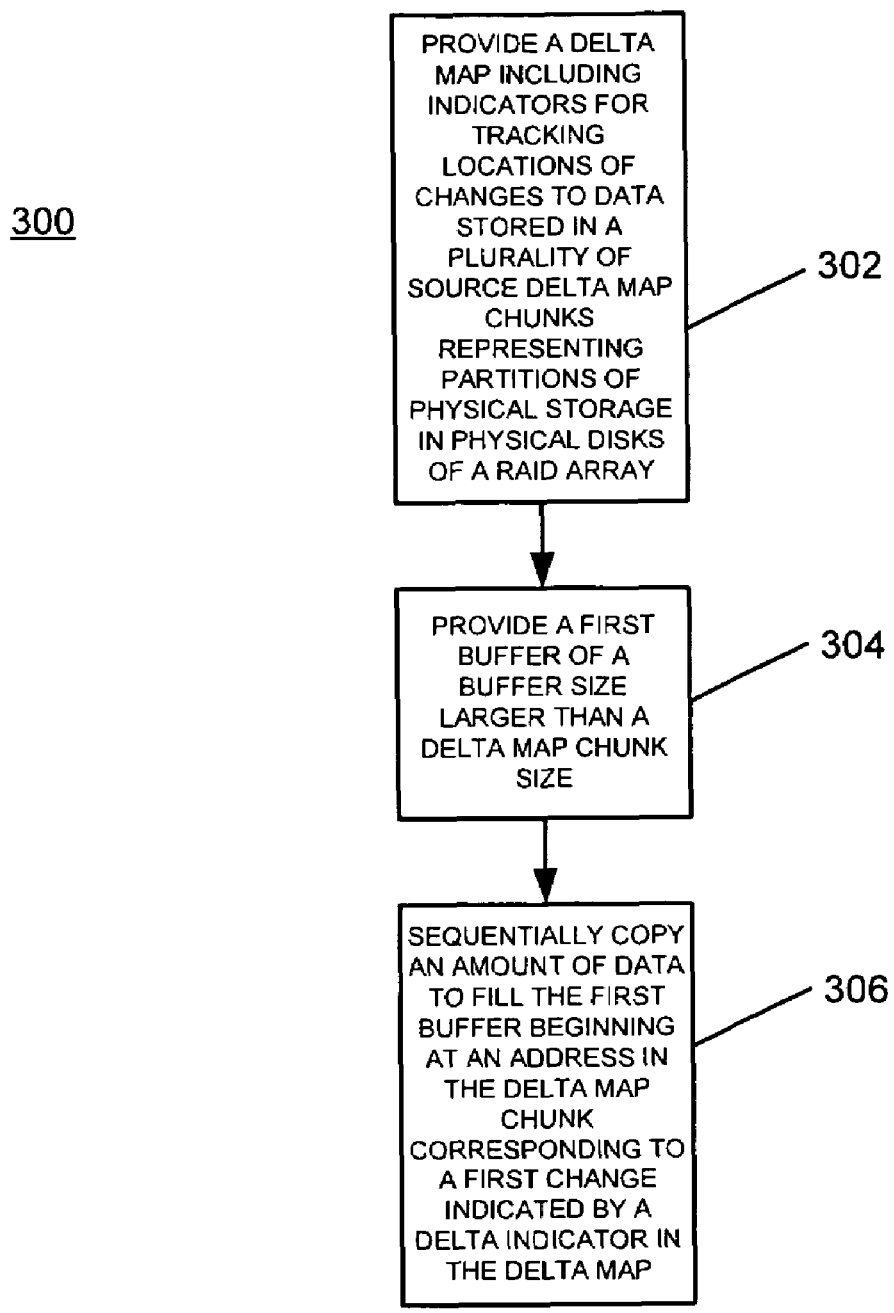
FIG. 3 is a flow chart of a redundant data storage process illustrating exemplary steps by which data may be copied from a source RAID array to a destination RAID array using buffers that are larger than delta map chunk sizes according to an embodiment of the subject matter described herein.

FIG. 3 illustrates a redundant data storage process 300 for using buffers that are larger than delta map chunks to copy data from one LUN to another, such as from source LUN 106 to destination LUN 114. At block 302, redundant data storage process 300 may provide a delta map including indicators for tracking locations of changes to data stored in a plurality of source delta map chunks of physical disks of a RAID array. At block 304, redundant data storage process 300 may provide a first buffer of a buffer size larger than a delta map chunk size. At block 306, redundant data storage process 300 may sequentially copy an amount of data to fill the first buffer beginning at end address in the delta map chunk corresponding to a first change indicated by a delta indicator in the delta map.

Figure 4:
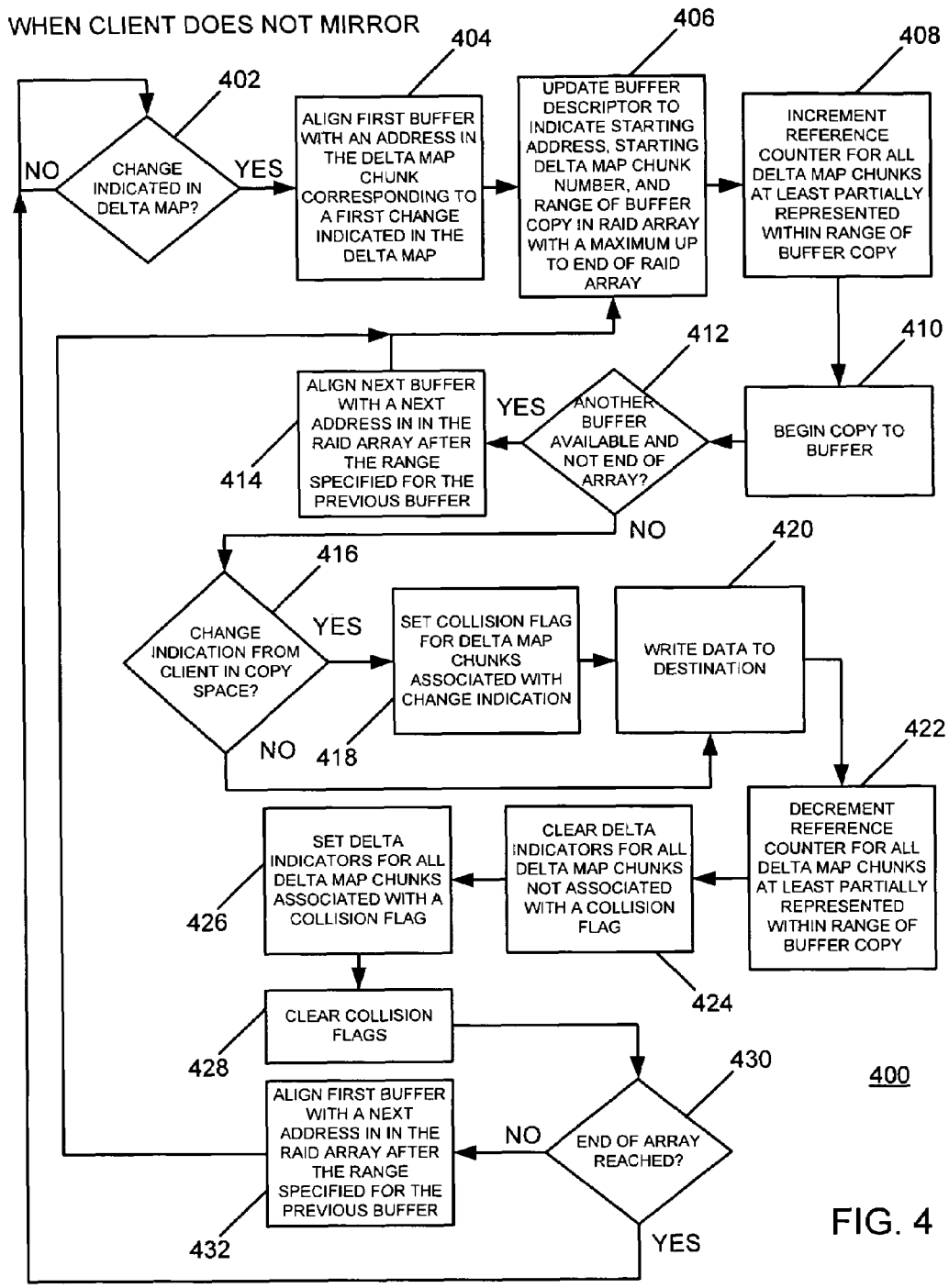
FIG. 4 is a flow chart of a redundant data storage process illustrating exemplary steps by which data may be copied from a source RAID array to a destination RAID array using buffers that are larger than delta map chunk sizes where a client does not mirror data to the destination RAID according to an embodiment of the subject matter described herein.

FIG. 4 illustrates a redundant data storage process 400 using buffers that are larger than delta map chunks when a client does not mirror data to a destination storage area, such as destination LUN 114. At decision point 402, redundant data storage process 400 may wait for a change indicator to be set in a delta map. Once a change has been represented by an indication in the delta map, redundant data storage process 400 may align a first buffer with an address in the delta map chunk corresponding to a first change indicated in the delta map at block 404. At block 406, buffer descriptors may be updated to indicate the starting address, starting delta map chunk number, and range of buffer copy in the RAID array. A maximum copy range for any iteration of redundant data storage process 400 may be up to the end of the source RAID array. At block 408, reference counters for all delta map chunks at least partially represented within the range of buffer copy may be incremented, and data copy to the buffer may begin at block 410.

At decision point 412, redundant data storage process 400 may determine whether there is another buffer available for use during the current iteration of copying or whether the end of the array has been reached within the current buffer. When there is another buffer available and the process is not at the end of the array, the next buffer may be aligned at a next address in the RAID array after the range specified for the previous buffer at block 414. Redundant data storage process 400 may transition back to block 406 and iterate for all remaining buffers that are available for this iteration of the copy process, again with a maximum up to the end of the source RAID array.

When all buffers available for the current copy iteration have been filled or the end of the array has been reached, as determined at decision point 412, a determination may be made at decision point 416 as to whether a change to any delta map chunk in the copy range has been made by the client. As described above, when a client does not mirror data, a race condition and a collision may occur when a client, such as application 102, writes to a delta map chunk represented in the buffer space of the current copy iteration. When a collision has occurred, a collision flag may be set for each delta map chunk associated with a change indication from the client at block 418.

When a collision has not occurred, as determined at decision point 416, or when the collision flag has been set for each delta map chunk associated with the collision at block 418, data may be written to the destination RAID array at block 420. As described above, the destination may be separate RAID array, such as destination LUN 114 or may be to another portion of the same RAID array 110 without departing from the scope of the subject matter described herein. When the data write to the destination area is complete, reference counters for all delta map chunks at least partially represented within the range of the buffer copy may be decremented at block 422. At block 424, delta indicators for all delta map chunks not associated with the collision flag may be cleared. Delta indicators for all delta map chunks that are associated with the collision flag may be set at block 426 and the collision flags may be cleared at block 428.

At decision point 430, redundant data storage process 400 may determine whether the end of the RAID array has been reached. When the end of the array has not been reached, the first buffer may be aligned with the next address in the RAID array after the range specified for the previous buffer in the previous iteration of the process at block 432. Redundant data storage process 400 may return to block 406 and iterate through the set of buffers as described above until the end of the RAID array is reached. When the end of the RAID array has been reached and all data has been copied, as determined at decision point 430, redundant data storage process 400 may return to decision point 402 to determine whether a change indicator has been set in the delta map during the previous iteration of the process and may wait for a change indication if no data has changed in the interim. As described above, when a collision has occurred during the iterative copying, a delta indicator for delta map chunks associated with the collision may have been set during the previous iteration of redundant data storage process 400 and redundant data storage process 400 may begin iteratively copying these delta map chunks along with any other delta map chunks that may have changed in the interim.

It should be noted that redundant data storage process 400 may be initially configured and then interrupt driven for subsequent iterations of buffer copies without departing from the scope of the subject matter described herein.

Figure 5:
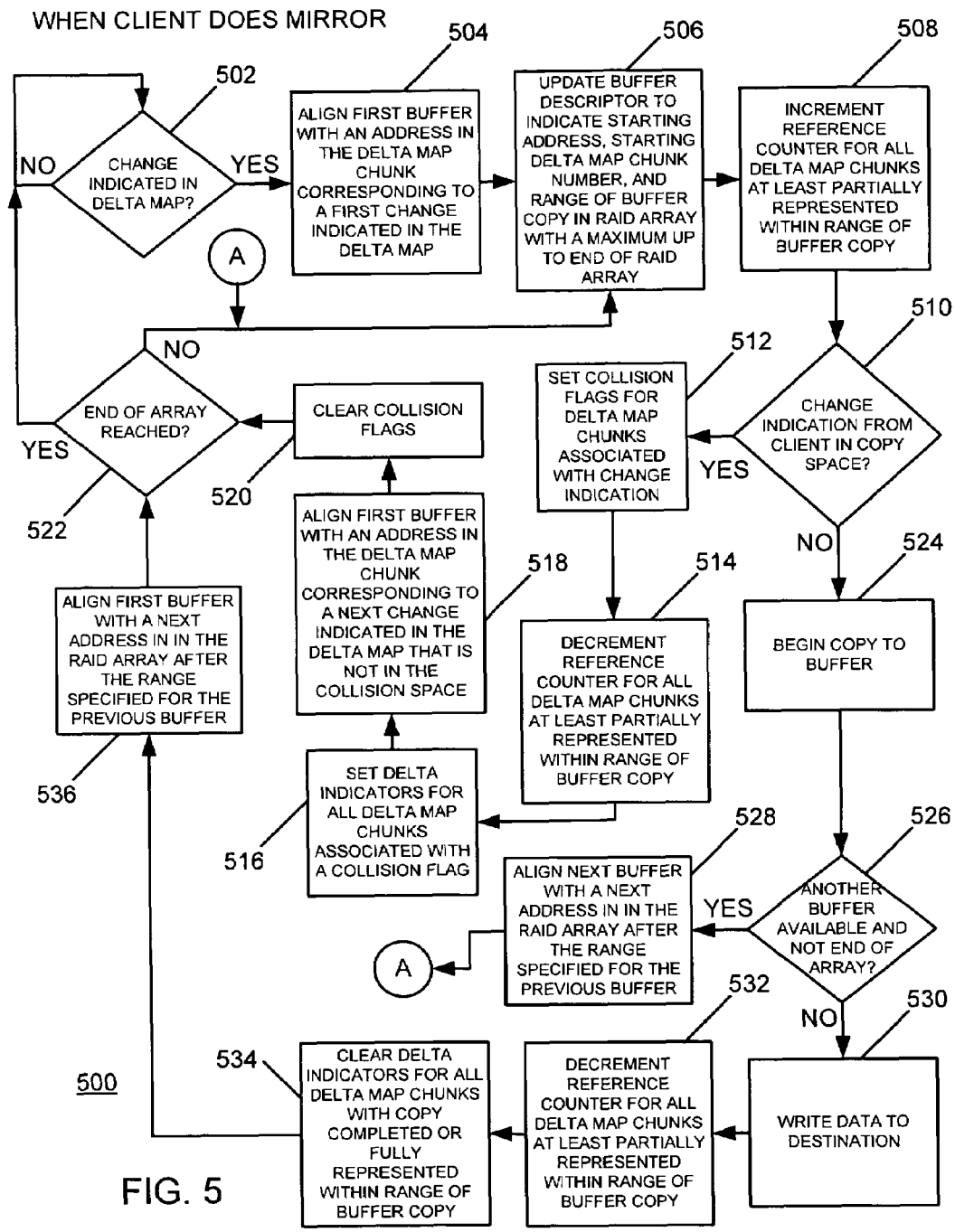
FIG. 5 is a flow chart of a redundant data storage process illustrating exemplary steps by which data may be copied from a source RAID array to a destination RAID array using buffers that are larger than delta map chunk sizes where a client mirrors data to the destination RAID according to an embodiment of the subject matter described herein.

FIG. 5 illustrates and exemplary redundant data storage process 500 for use when a client mirrors data. Redundant data storage process 500 may wait at decision point 502 for a change indicator in the delta map to be set. At block 504, the first buffer may be aligned with an address in the delta map chunk corresponding to a first change indicated in the delta map. At block 506, the buffer descriptor for the buffer may be updated to indicate a starting address, the starting delta map chunk number, and a range of buffer copy in the RAID array with a maximum up to the end of the RAID array. At block 508, the reference counter for all delta map chunks at least partially represented within the range of the buffer copy may be incremented.

At decision point 510, a determination may be made as to whether a change in the copy space of the destination has or will occur during the copy process by communicating with the client to determine whether any current mirror copies are being processed by the client in the current buffer copy space. When a change in the destination buffer copy space has been indicated at decision point 510, collision flags for the delta map chunks associated with the change indication may be set at block 512. At block 514, reference counters for all delta map chunks at least partially represented within the range of the buffer copy may be decremented. Delta indicators for all delta map chunks associated with the collision flag may be set at block 516. At block 518, the first buffer may be aligned with an address in the delta map chunk corresponding to the next change indicator in the delta map that is not in the collision space and the collision flags may be cleared at block 520.

At decision point 522, a determination may be made as to whether the end of the RAID array has been reached. When the end of the RAID array has not been reached, redundant data storage process 500 may return to block 506 to iteratively process more copies from the source RAID array to the destination storage area.

When a change indication from the client for the copy space has not been identified at decision point 510, a copy of the delta map chunks overlaid by the buffer may begin at block 524. At decision point 526, redundant data storage process 500 may determine whether there is another buffer available in the current iteration or whether the end of the array has been reached. When there is another available buffer and the end of the array has not been reached, the next buffer may be aligned with the next address from the RAID array after the range specified for the previous buffer at block 528 and the process may return to block 506 to iterate through the remaining buffers available for this iteration of the copying process. When there is not another buffer available or the end of the array has been reached, as determined at decision point 526, data may be written to the destination at block 530. As described above, the destination may be either another portion of the source RAID array or a remote physically separate RAID array without departing from the subject matter described herein. At block 532, reference counters for all delta map chunks at least partially represented within the range of the buffer copy may be decremented. At block 534, delta indicators for all delta map chunks that have had their copy completed after a previous iteration of the process or that have been fully copied during this iteration may be cleared. As described above, a buffer start address may be aligned within a delta map chunk at an address other than the beginning of the delta map chunk. Accordingly, when this occurs and the remaining data from the delta map chunk is copied to the destination, this may be considered a completed copy within block 534 and the delta indicator may be cleared for the associated delta map chunk. At block 536, the first buffer may be aligned with the next address in the RAID array after the range specified for the previous buffer. Block 536 may be considered an optional block when the end of the array was previously identified at decision point 526. When the end of the array has been reached, as determined at decision point 522, redundant data storage process 500 may return to decision point 502 to await a change indication in the delta map. As described above, when a collision has occurred, delta indicators may have been set for all delta map chunks associated with the collision and redundant data storage process 500 may immediately being processing at the delta map chunks represented by the delta indicators or at another address within RAID array 110 if other change indicators have been set in the interim period.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimized copying of logical units (LUNs) in a redundant array of inexpensive disks (RAID) environment using buffers that are larger than delta map chunks, the method comprising:
   (a) providing a delta map including delta indicators for tracking locations of changes to data stored in a plurality of source and destination delta map chunks representing partitions of storage in physical disks of a redundant array of inexpensive disks (RAID) array, wherein each delta indicator corresponds to a delta map chunk and indicates whether data in the corresponding delta map chunk has changed, and wherein the delta indicator is updated when an application changes data in the corresponding delta map chunk;
   (b) providing a first buffer of a buffer size larger than a delta map chunk size; and
   (c) sequentially copying an amount of data to fill the first buffer beginning at an address in the delta map chunk corresponding to a first change indicated by a delta indicator in the delta map.

2. The method of claim 1 comprising providing a buffer descriptor for tracking a start address, a starting delta map chunk number, and a range of buffer copy in a RAID array for the first buffer.

3. The method of claim 2 comprising updating the buffer descriptor associated with the first buffer prior to sequentially copying the amount of data.

4. The method of claim 1 comprising providing a plurality of destination delta map chunks.

5. A method for optimized copying of logical units (LUNs) in a redundant array of inexpensive disks (RAID) environment using buffers that are larger than delta map chunks, the method comprising:
(a) providing a delta map including delta indicators for tracking locations of changes to data stored in a plurality of source and destination delta map chunks representing partitions of storage in physical disks of a redundant array of inexpensive disks (RAID) array;
(b) providing a first buffer of a buffer size larger than a delta map chunk size;
(c) sequentially copying an amount of data to fill the first buffer beginning at an address in the delta map chunk corresponding to a first change indicated by a delta indicator in the delta map; and
(d) incrementing a reference counter associated with each of the plurality of source delta map chunks that are at least partially copied to the first buffer.

6. The method of claim 5 comprising decrementing the reference counter associated with each of the plurality of source delta map chunks that are at least partially copied to the first buffer when the amount of data is written to the plurality of destination delta map chunks.

7. A method for optimized copying of logical units (LUNs) in a redundant array of inexpensive disks (RAID) environment using buffers that are larger than delta map chunks, the method comprising:
(a) providing a delta map including delta indicators for tracking locations of changes to data stored in a plurality of source delta map chunks representing partitions of storage in physical disks of a redundant array of inexpensive disks (RAID) array;
(b) providing a first buffer of a buffer size larger than a delta map chunk size;
(c) sequentially copying an amount of data to fill the first buffer beginning at an address in the delta map chunk corresponding to a first change indicated by a delta indicator in the delta map; and
(d) providing a collision map including collision indicators for tracking locations of collisions represented by changes to data stored in a plurality of destination delta map chunks prior to a write operation of the amount of data from the first buffer to the plurality of destination delta map chunks.

8. The method of claim 7 comprising abandoning the write operation to the plurality of destination delta map chunks corresponding to collision indicators in the collision map set in response to a collision.

9. The method of claim 8 comprising setting delta indicators in the delta map corresponding to delta map chunks associated with collision indicators in the collision map and clearing the collision indicators.

10. A method for optimized copying of logical units (LUNs) in a redundant array of inexpensive disks (RAID) environment using buffers that are larger than delta map chunks, the method comprising:
(a) providing a delta map including delta indicators for tracking locations of changes to data stored in a plurality of source delta map chunks representing partitions of storage in physical disks of a redundant array of inexpensive disks (RAID) array;
(b) providing a first buffer of a buffer size larger than a delta map chunk size;
(c) sequentially copying an amount of data to fill the first buffer beginning at an address in the delta map chunk corresponding to a first change indicated by a delta indicator in the delta map; and
(d) providing a collision map including collision indicators for tracking locations of collisions represented by changes to data stored in the plurality of source delta map chunks during the sequential copying of the amount of data to fill the first buffer.

11. The method of claim 10 comprising setting delta indicators in the delta map corresponding to delta map chunks associated with collision indicators in the collision map and clearing the collision indicators.

12. The method of claim 11 comprising aligning the first buffer at a second address in the delta map chunk corresponding to a second change indicated by a delta indicator in the delta map and sequentially copying an amount of data to fill the first buffer beginning at the second address.

13. The method of claim 1 comprising clearing delta indicators associated with the plurality of source delta map chunks that are completely written to a plurality of destination delta map chunks.

14. A system for optimized copying of logical units (LUNs) in a redundant array of inexpensive disks (RAID) environment using buffers that are larger than delta map chunks, the system comprising:
(a) a redundant array of inexpensive disks (RAID) array including a plurality of source and destination delta map chunks representing partitions of storage in physical disks of the RAID array; and
(b) a copy engine, including a delta map having delta indicators for tracking locations of changes to data stored in the plurality of delta map chunks, wherein each delta indicator corresponds to a delta map chunk and indicates whether the data in the corresponding delta map chunk has changed, and wherein each delta indicator is updated when an application changes data in the corresponding delta map chunk, the copy engine being adapted to:
(i) provide a first buffer of a buffer size larger than a delta map chunk size; and
(ii) sequentially copy an amount of data to fill the first buffer beginning at an address in the delta map chunk corresponding to a first change indicated by a delta indicator in the delta map.

15. The system of claim 14 wherein the copy engine is adapted to provide a buffer descriptor for tracking a start address, a starting delta map chunk number, and a range of buffer copy in a RAID array for the first buffer.

16. The system of claim 15 wherein the copy engine is adapted to update the buffer descriptor associated with the first buffer prior to sequentially copying the amount of data.

17. The system of claim 14 comprising a plurality of destination delta map chunks.

18. A system for optimized copying of logical units (LUNs) in a redundant array of inexpensive disks (RAID) environment using buffers that are larger than delta map chunks, the system comprising:
(a) a redundant array of inexpensive disks (RAID) array including a plurality of source and destination delta map chunks representing partitions of storage in physical disks of the RAID array; and
(b) a copy engine, including a delta map having delta indicators for tracking locations of changes to data stored in the plurality of delta map chunks, the copy engine being adapted to:
(i) provide a first buffer of a buffer size larger than a delta map chunk size; and
(ii) sequentially copy an amount of data to fill the first buffer beginning at an address in the delta map chunk corresponding to a first change indicated by a delta indicator in the delta map, wherein the copy engine is adapted to increment a reference counter associated with each of the plurality of source delta map chunks that are at least partially copied to the first buffer.

19. The system of claim 18 wherein the copy engine is adapted to decrement the reference counter associated with each of the plurality of source delta map chunks that are at least partially copied to the first buffer when the amount of data is written to the plurality of destination delta map chunks.

20. A system for optimized copying of logical units (LUNs) in a redundant array of inexpensive disks (RAID) environment using buffers that are larger than delta map chunks, the system comprising:
   (a) a redundant array of inexpensive disks (RAID) array including a plurality of delta map chunks representing partitions of storage in physical disks of the RAID array; and
   (b) a copy engine, including a delta map having delta indicators for tracking locations of changes to data stored in the plurality of delta map chunks, the copy engine being adapted to:
      (i) provide a first buffer of a buffer size larger than a delta map chunk size; and
      (ii) sequentially copy an amount of data to fill the first buffer beginning at an address in the delta map chunk corresponding to a first change indicated by a delta indicator in the delta map, wherein the copy engine is adapted to provide a collision map including collision indicators for tracking locations of collisions represented by changes to data stored in a plurality of destination delta map chunks prior to a write operation of the amount of data from the first buffer to the plurality of destination delta map chunks.

21. The system of claim 20 wherein the copy engine is adapted to abandon the write operation to the plurality of destination delta map chunks corresponding to collision indicators in the collision map set in response to a collision.

22. The system of claim 21 wherein the copy engine is adapted to set delta indicators in the delta map corresponding to delta map chunks associated with collision indicators in the collision map and to clear the collision indicators.

23. A system for optimized copying of logical units (LUNs) in a redundant array of inexpensive disks (RAID) environment using buffers that are larger than delta map chunks, the system comprising:
   (a) a redundant array of inexpensive disks (RAID) array including a plurality of delta map chunks representing partitions of storage in physical disks of the RAID array; and
   (b) a copy engine, including a delta map having delta indicators for tracking locations of changes to data stored in the plurality of delta map chunks, the copy engine being adapted to:
      (i) provide a first buffer of a buffer size larger than a delta map chunk size; and
      (ii) sequentially copy an amount of data to fill the first buffer beginning at an address in the delta map chunk corresponding to a first change indicated by a delta indicator in the delta map, wherein the copy engine is adapted to provide a collision map including collision indicators for tracking locations of collisions represented by changes to data stored in a plurality of source delta map chunks during the sequential copying of the amount of data to fill the first buffer.

24. The system of claim 23 wherein the copy engine is adapted to set delta indicators in the delta map corresponding to delta map chunks associated with collision indicators in the collision map and to clear the collision indicators.

25. The system of claim 24 wherein the copy engine is adapted to align the first buffer at a second address in the delta map chunk corresponding to a second change indicated by a delta indicator in the delta map and to sequentially copy an amount of data to fill the first buffer beginning at the second address.

26. The system of claim 14 wherein the copy engine is adapted to clear delta indicators associated with the plurality of source delta map chunks that are completely written to a plurality of destination delta map chunks.

27. A computer program product comprising computer-executable instructions embodied in a computer-readable medium for performing steps comprising:
   (a) providing a delta map including delta indicators for tracking locations of changes to data stored in a plurality of source and destination delta map chunks representing partitions of storage in physical disks of a redundant array of inexpensive disks (RAID) array, wherein each delta indicator corresponds to a delta map chunk and indicates whether the data in the corresponding delta map chunk has changed, and wherein the delta indicator is updated when an application changes data in the corresponding delta map chunk;
   (b) providing a first buffer of a buffer size larger than a delta map chunk size; and
   (c) sequentially copying an amount of data to fill the first buffer beginning at an address in the delta map chunk corresponding to a first change indicated by a delta indicator in the delta map.

\* \* \* \* \*